(12) United States Patent
Guim Bernat et al.

(10) Patent No.: US 10,915,791 B2
(45) Date of Patent: Feb. 9, 2021

(54) STORING AND RETRIEVING TRAINING DATA FOR MODELS IN A DATA CENTER

(71) Applicant: Intel Corporation, Santa Clara, CA (US)

(72) Inventors: Francesc Guim Bernat, Barcelona (ES); Karthik Kumar, Chandler, AZ (US); Mark A. Schmisseur, Phoenix, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 15/855,891

(22) Filed: Dec. 27, 2017

(65) Prior Publication Data
US 2019/0034763 A1   Jan. 31, 2019

(51) Int. Cl.
| G06K 9/62 | (2006.01) |
| G06N 5/04 | (2006.01) |
| G06F 13/16 | (2006.01) |
| H04L 12/24 | (2006.01) |
| H04L 29/08 | (2006.01) |
| G06F 12/02 | (2006.01) |
| G06F 12/04 | (2006.01) |

(52) U.S. Cl.
CPC ......... *G06K 9/6257* (2013.01); *G06F 12/023* (2013.01); *G06F 12/0284* (2013.01); *G06F 12/04* (2013.01); *G06F 13/1668* (2013.01); *G06N 5/04* (2013.01); *H04L 41/5003* (2013.01); *H04L 67/107* (2013.01)

(58) Field of Classification Search
CPC ..... G06F 3/0647; G06F 16/119; G06F 16/214
See application file for complete search history.

(56) References Cited

U.S. PATENT DOCUMENTS

| 8,626,791 B1 | 1/2014 | Lin et al. |
| 2016/0359683 A1 | 12/2016 | Baartfai-Walcott et al. |

FOREIGN PATENT DOCUMENTS

WO   WO 2016/045055 A1   3/2016

OTHER PUBLICATIONS

European Search Report dated May 29, 2019; Application No. 18208737.9; 92 Pages.

*Primary Examiner* — Gary W. Cygiel
(74) *Attorney, Agent, or Firm* — Compass IP Law PC

(57) ABSTRACT

Technology for a memory controller is described. The memory controller can receive a request to store training data. The request can include a model identifier (ID) that identifies a model that is associated with the training data. The memory controller can send a write request to store the training data associated with the model ID in a memory region in a pooled memory that is allocated for the model ID. The training data that is stored in the memory region in the pooled memory can be addressable based on the model ID.

22 Claims, 5 Drawing Sheets

US 10,915,791 B2

STORING AND RETRIEVING TRAINING DATA FOR MODELS IN A DATA CENTER

BACKGROUND

Artificial intelligence (AI) can involve discovering patterns in input data, constructing AI models using discovered patterns in the input data, and using the AI models to make predictions on subsequently received data. In one example, building the AI model can involve collecting input data for generation of the AI model. The input data can be received from a data provider. The input data can be used as training data to train the AI model. For example, the AI model can be trained using the training data to recognize patterns in input data and make inferences with respect to the input data.

In one example, building and training AI models can involve processing a relatively large input data set, which can consume a relatively large amount of computing resources. Therefore, AI is generally performed using dedicated graphics processing unit (GPU) and field-programmable gate array (FPGA) hardware in a cloud environment.

BRIEF DESCRIPTION OF THE DRAWINGS

Features and advantages of invention embodiments will be apparent from the detailed description which follows, taken in conjunction with the accompanying drawings, which together illustrate, by way of example, invention features; and, wherein.

Figure 1:
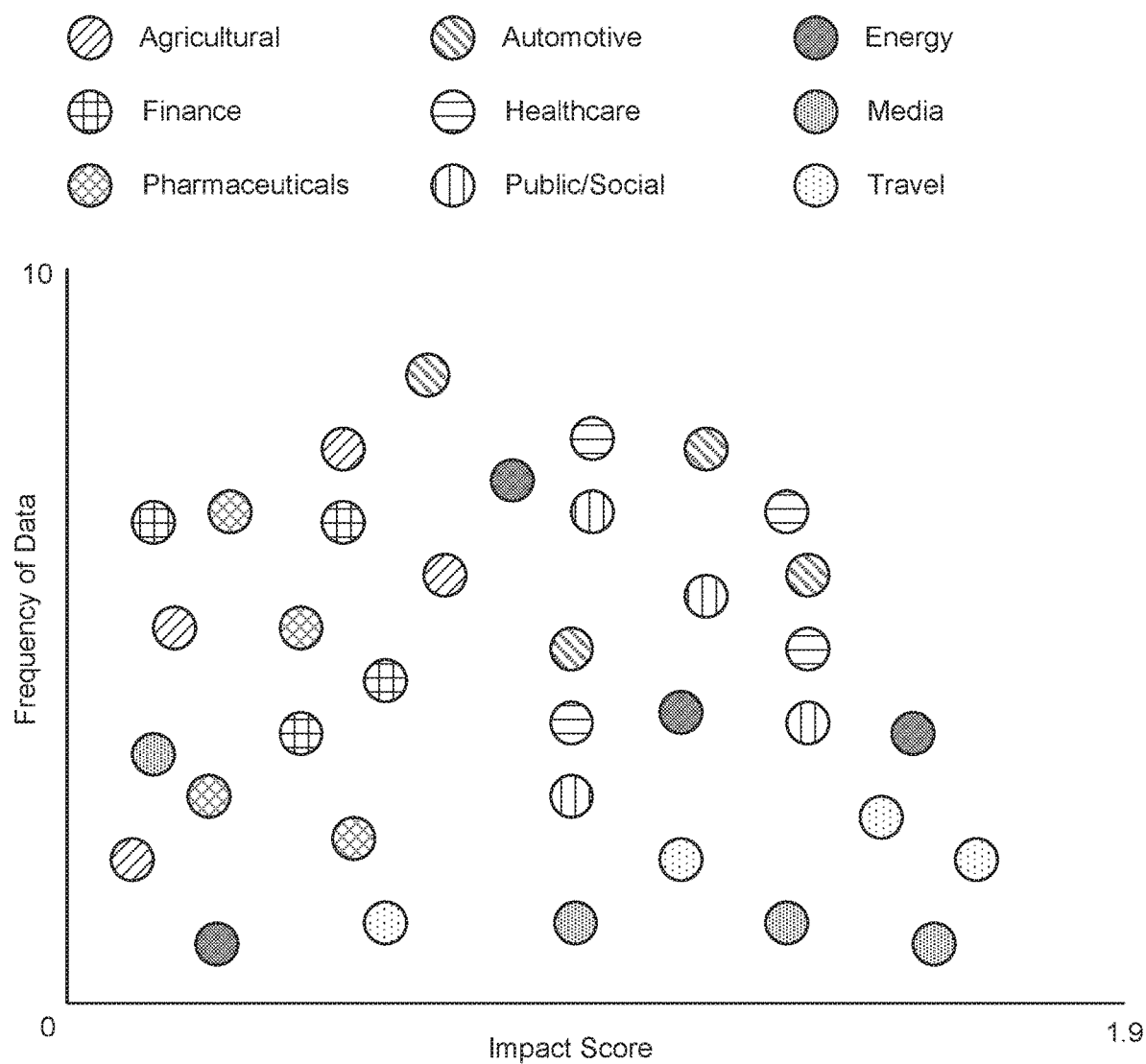
FIG. 1 illustrates the applicability of AI to various industries and use cases in accordance with an example embodiment.

Reference will now be made to the exemplary embodiments illustrated, and specific language will be used herein to describe the same. It will nevertheless be understood that no limitation on invention scope is thereby intended.

DESCRIPTION OF EMBODIMENTS

Before the disclosed invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various invention embodiments. One skilled in the relevant art will recognize, however, that such detailed embodiments do not limit the overall inventive concepts articulated herein, but are merely representative thereof.

As used in this specification and the appended claims, the singular forms "a," "an" and "the" include plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one embodiment of the present invention. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

In recent years, increased performance and capabilities of hardware platforms have enabled advances in artificial intelligence (AI). This recent advancement in AI can be due to high-density compute platforms, which can be better equipped to process increased data set sizes. In other words, these high-density compute platforms can achieve increased performance levels on AI workloads. For example, as training AI models (or deep learning networks) involves moving large amounts of data, current hardware platforms used for AI can include high-capacity, high-speed, high bandwidth memory technologies, which can provide a maximum level of on-chip storage and an increased memory access speed. Current hardware platforms used for AI can offer separate pipelines for computation and data management. In addition, current hardware platforms used for AI can include bi-directional high-bandwidth links, which can enable application-specific integrated circuits (ASICs) to interconnect so data can move between them, which can result in additional compute resources being assigned to a task or model size expansion without a decrease in speed.

In one example, performing training for AI models can involve a large amount of data processing. A relatively large amount of computing power can be used to generate the AI models, such as deep neural networks, as well as a relatively large amount of memory capacity. Within this large amount of data (e.g., a plurality of different data sets), data priority and value can vary for different data usages. For example, a particular data set that is beneficial when training a first AI model can be less beneficial when training a second AI model. However, in past solutions, it would be difficult to identify and select higher priority data sets within the plurality of different data sets. As a result, all of the different data sets would be used to train the AI models, which would increase compute and memory resources, even when certain data sets had less impact during training of the AI models.

Therefore, in the present technology, different data sets can be associated with specific AI models (or AI model identifiers (IDs)). A data set that is associated with a specific AI model can be a higher priority data set for that AI model, whereas a data set that is not associated with a specific AI model can be a lower priority data set for that AI model. These data sets can be configured on a per data set basis, such that individual data sets can be associated with specific AI models. As a result, higher priority data sets can be used to train certain AI model(s), while lower priority data may not be used to train certain AI model(s), thereby reducing computing and memory consumption.

In the present technology, a memory controller can initiate read and write operations in pooled memory. The memory controller and the pooled memory can be included in a pooled memory subsystem. In one example, the pooled memory subsystem can be included in a storage rack in a data center. While much of the following discussion relates to storage racks, drawers, and data centers, such is merely for convenience, and is not to be seen qas limiting. The pooled memory can provide the benefit of dynamically scaling up the memory attached to a particular AI model running on a particular node, which can improve total cost of ownership (TCO). In one example, the memory controller can receive read and write requests from a requestor (e.g., a processor, a core, a node, a host or an AI hardware platform), and the memory controller can initiate the read and write operations for the requestor. For example, the memory controller can initiate the read and write operations by generating memory commands (e.g., read requests, write requests or erase requests) that are sent to media controllers on dual in-line memory modules (DIMMs). The processors and AI hardware platforms, as well as the pooled memory, can be included in separate drawer(s) in the pooled memory subsystem. In one example, in response to a write request from a processor, the memory controller can write training data to the pooled memory with respect to a certain AI model identifier (ID) (or AI model). In other words, the training data to be stored in the pooled memory can be associated with a certain AI model ID. In another example, in response to a read request from the AI hardware platform, the memory controller can read the training data from the pooled memory. The memory controller can read the training data per the AI model ID, as opposed to reading the training data based on specific addresses in the pooled memory. In addition, the AI model ID can be a universally unique identifier (UUID), and the AI model ID can be previously agreed upon by devices and a data center or owner models.

In one example, memory in the pooled memory subsystem can be volatile memory, nonvolatile memory (NVM), or a combination thereof. Volatile memory can include any type of volatile memory, and is not considered to be limiting. Volatile memory is a storage medium that requires power to maintain the state of data stored by the medium. Non-limiting examples of volatile memory can include random access memory (RAM), such as static random-access memory (SRAM), dynamic random-access memory (DRAM), synchronous dynamic random-access memory (SDRAM), and the like, including combinations thereof. SDRAM memory can include any variant thereof, such as single data rate SDRAM (SDR DRAM), double data rate (DDR) SDRAM, including DDR, DDR2, DDR3, DDR4, DDR5, and so on, described collectively as DDRx, and low power DDR (LPDDR) SDRAM, including LPDDR, LPDDR2, LPDDR3, LPDDR4, and so on, described collectively as LPDDRx. In some examples, DRAM complies with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209B for LPDDR SDRAM, JESD209-2F for LPDDR2 SDRAM, JESD209-3C for LPDDR3 SDRAM, and JESD209-4A for LPDDR4 SDRAM (these standards are available at www.jedec.org; DDR5 SDRAM is forthcoming). Such standards (and similar standards) may be referred to as DDR-based or LPDDR-based standards, and communication interfaces that implement such standards may be referred to as DDR-based or LPDDR-based interfaces. In one specific example, the system memory can be DRAM. In another specific example, the system memory can be DDRx SDRAM. In yet another specific aspect, the system memory can be LPDDRx SDRAM.

NVM is a storage medium that does not require power to maintain the state of data stored by the medium. NVM has traditionally been used for the task of data storage, or long-term persistent storage, but new and evolving memory technologies allow the use of NVM in roles that extend beyond traditional data storage. One example of such a role is the use of NVM as main or system memory. Non-volatile system memory (NVMsys) can combine data reliability of traditional storage with ultra-low latency and high bandwidth performance, having many advantages over traditional volatile memory, such as high density, large capacity, lower power consumption, and reduced manufacturing complexity, to name a few. Byte-addressable, write-in-place NVM such as three-dimensional (3D) cross-point memory, for example, can operate as byte-addressable memory similar to dynamic random-access memory (DRAM), or as block-addressable memory similar to NAND flash. In other words, such NVM can operate as system memory or as persistent storage memory (NVMstor). In some situations where NVM is functioning as system memory, stored data can be discarded or otherwise rendered unreadable when power to the NVMsys is interrupted. NVMsys also allows increased flexibility in data management by providing non-volatile, low-latency memory that can be located closer to a processor in a computing device. In some examples, NVMsys can reside on a DRAM bus, such that the NVMsys can provide ultra-fast DRAM-like access to data. NVMsys can also be useful in computing environments that frequently access large, complex data sets, and environments that are sensitive to downtime caused by power failures or system crashes.

Non-limiting examples of NVM can include planar or three-dimensional (3D) NAND flash memory, including single or multi-threshold-level NAND flash memory, NOR flash memory, single or multi-level Phase Change Memory (PCM), such as chalcogenide glass PCM, planar or 3D PCM, cross-point array memory, including 3D cross-point memory, non-volatile dual in-line memory module (NVDIMM)-based memory, such as flash-based (NVDIMM-F) memory, flash/DRAM-based (NVDIMM-N) memory, persistent memory-based (NVDIMM-P) memory, 3D cross-point-based NVDIMM memory, resistive RAM (ReRAM), including metal-oxide- or oxygen vacancy-based ReRAM, such as $HfO_2$—, $Hf/HfO_x$—, $Ti/HfO_2$—, $TiO_x$—, and $TaO_x$-based ReRAM, filament-based ReRAM, such as $Ag/GeS_2$—, $ZrTe/Al_2O_3$—, and Ag-based ReRAM, programmable metallization cell (PMC) memory, such as conductive-bridging RAM (CBRAM), silicon-oxide-nitride-oxide-silicon (SONOS) memory, ferroelectric RAM (FeRAM), ferroelectric transistor RAM (Fe-TRAM), anti-ferroelectric memory, polymer memory (e.g., ferroelectric polymer memory), magnetoresistive RAM (MRAM), write-in-place non-volatile MRAM (NVMRAM), spin-transfer torque (STT) memory, spin-orbit torque (SOT) memory, nanowire memory, electrically erasable programmable read-only memory (EEPROM), nanotube RAM (NRAM), other memristor- and thyristor-based memory, spintronic magnetic junction-based memory, magnetic tunneling junction (MTJ)-based memory, domain wall (DW)-based memory, and the like, including combinations thereof. The term "memory device" can refer to the die itself and/or to a packaged memory product. NVM can be byte or block addressable. In some examples, NVM can comply with one or more standards promulgated by the Joint Electron Device Engineering Council (JEDEC), such as JESD21-C, JESD218, JESD219, JESD220-1, JESD223B, JESD223-1, or other suitable standard (the JEDEC standards cited herein are available at www.jedec.org). In one specific example, the NVM can be 3D cross-point memory. In another specific example, the memory can be NAND or 3D NAND memory. In another specific example, the system memory can be STT memory.

FIG. 1 illustrates an example of the applicability of AI to various industries and use cases. For example, AI has broad potential applicability in a wide variety of areas, such as agriculture (e.g., for personalizing crops to individual conditions), finance (e.g., for identifying fraudulent transactions or personalizing financial products), pharmaceuticals (e.g., for optimizing clinical trials), automotive industries (e.g., for identifying and navigating roads), healthcare (e.g., for predicting personalized health outcomes or diagnosing diseases), public/social industries, consumer goods (e.g., for optimizing merchandising strategy), manufacturing (e.g., for predictive maintenance), telecommunications, energy (e.g., for predictive maintenance), media (e.g., for personalizing advertising or discovering new consumer trends), travel, transport, logistics (e.g., for optimizing pricing and scheduling in real time), etc. In addition, certain industries and use cases can be associated with an increased impact score, indicating that the applicability to AI in these areas is even more important.

In one configuration, in the present technology, a memory pooling and disaggregation architecture can be used in data center architectures that host training and inferencing AI data for multiple AI models being trained. The memory pooling and disaggregation architecture permits the handling of varied data priorities on a per-AI model granularity, and can be optimized to handle AI applications (e.g., specifying service level agreements (SLAs) or satisfying quality of service (QoS)). In one example, the QoS can involve limiting an amount of bandwidth for data that is sent to a particular AI model ID, or the QoS can provide additional priority to certain types of AI models or AI model IDs. The memory pooling and disaggregation architecture can manage and schedule pooled memory chunks or data units (e.g., memory lines or 4 kilobyte (KB) blocks of data) based on AI models and priorities associated with the pooled memory chunks or data units, which can allow for improved data management of data center appliances oriented to AI appliances.

In the present technology, the memory pooling and disaggregation architecture can implement a training data set memory pool, and this new type of memory pool can store and organize training data on an AI model basis. In one example, a memory pool can be a plurality of disaggregated memory devices. The training data set memory pool can be specialized for AI training models. As a result, a software stack can access training data in the pooled memory on a per AI model basis. In addition, performance and reliability requirements can be specified per AI model, which can enable prioritization on a per data set basis.

In the present technology, the memory pooling and disaggregation architecture can include a hierarchical memory controller, which can be used to distribute training data in a certain number of memory drawers depending on an AI model requirement. The hierarchical memory controller can determine to distribute training data to certain memory drawers and racks to satisfy an SLA (e.g., a particular bandwidth), and the training data can be distributed to multiple AI data drawers (e.g., N drawers having different resiliency characteristics, wherein N is an integer).

The memory pooling and disaggregation architecture can include a rack pooled memory controller. A given storage rack can include one or more rack pooled memory controllers depending on a required level of performance for the storage rack. The rack pooled memory controller can define specific levels of performance and resiliency for a particular AI model. The rack pooled memory controller can receive write requests (e.g., from a processor, node, host, core, etc.), and the rack pooled memory controller can distribute training data across different memory pools depending on an application performance requirement (e.g., an increased application performance requirement can imply more distributions of the training data). As described in additional detail below, the rack pooled memory controller can include an interface to register new types of AI models. The interface can provide an AI model ID as well as metadata that includes a definition of a data set entry (e.g., a size of a data set entry). The rack pooled memory controller can include an interface to allocate new memory to a particular AI model ID. The rack pooled memory controller can determine the allocation of the memory in existing memory pools based on performance requirements (e.g., an SLA). The rack pooled memory controller can include interfaces to read and write training data sets for particular AI model IDs. The rack pooled memory controller can determine the applicable memory pools for reading and writing the training data sets to optimize performance and/or to satisfy an SLA. In addition, the rack pooled memory controller can include an interface to allow other compute elements to discover training data sets (corresponding to AI model IDs) that are current being hosted within the memory pooling and disaggregation architecture and associated metadata.

In the present technology, AI training models running on an AI hardware platform can pull training data from pooled memory for a particular AI model ID, as opposed to pulsing specific data. For example, the rack pooled memory controller can use metadata defining a data set structure for a particular AI model to gather memory lines from an endpoint memory dual in-line memory modules (DIMMs), and the rack pooled memory controller can send to the AI training model a data sent corresponding to the memory lines. For example, an AI training model can pull a data set for AI model ConversatonsType1, as opposed to reading an address X that is known to contain conversation 1, which can provide additional flexibility and ease in the distribution and management of training data across multiple memory pools. In other words, the training data can be accessed per an AI data set instance ID, as opposed to traditional memory lines.

The memory pooling and disaggregation architecture can include drawer memory controller(s), which can provide interfaces for writing and reading training data sets per AI model. The write interface can come directly from a client or from the rack pooled memory controller depending on a latency requirement. For example, a write interface from the rack pooled memory controller can have higher latency, but higher bandwidth due to load balancing. Similar to the rack pooled memory controller, the drawer memory controller(s) can have interfaces to: register new types of AI models, allocate new memory to a particular AI model ID, read and write training data sets for particular AI model IDs, and discover training data sets (corresponding to AI model IDs) that are current being hosted within the memory pooling and disaggregation architecture. The drawer memory controller(s) can perform load balancing within DIMMS (or other types of memory) hosted in a same memory pool. The drawer memory controller(s) can include logic to read training data from the DIMMs using metadata for a particular AI model ID (which can indicate how to construct a training data set). In addition, the drawer memory controller(s) can remove training data sets from memory after reading the training data sets, in accordance with a bit in a read requests that specifies to delete the training data sets from the memory.

Figure 2:
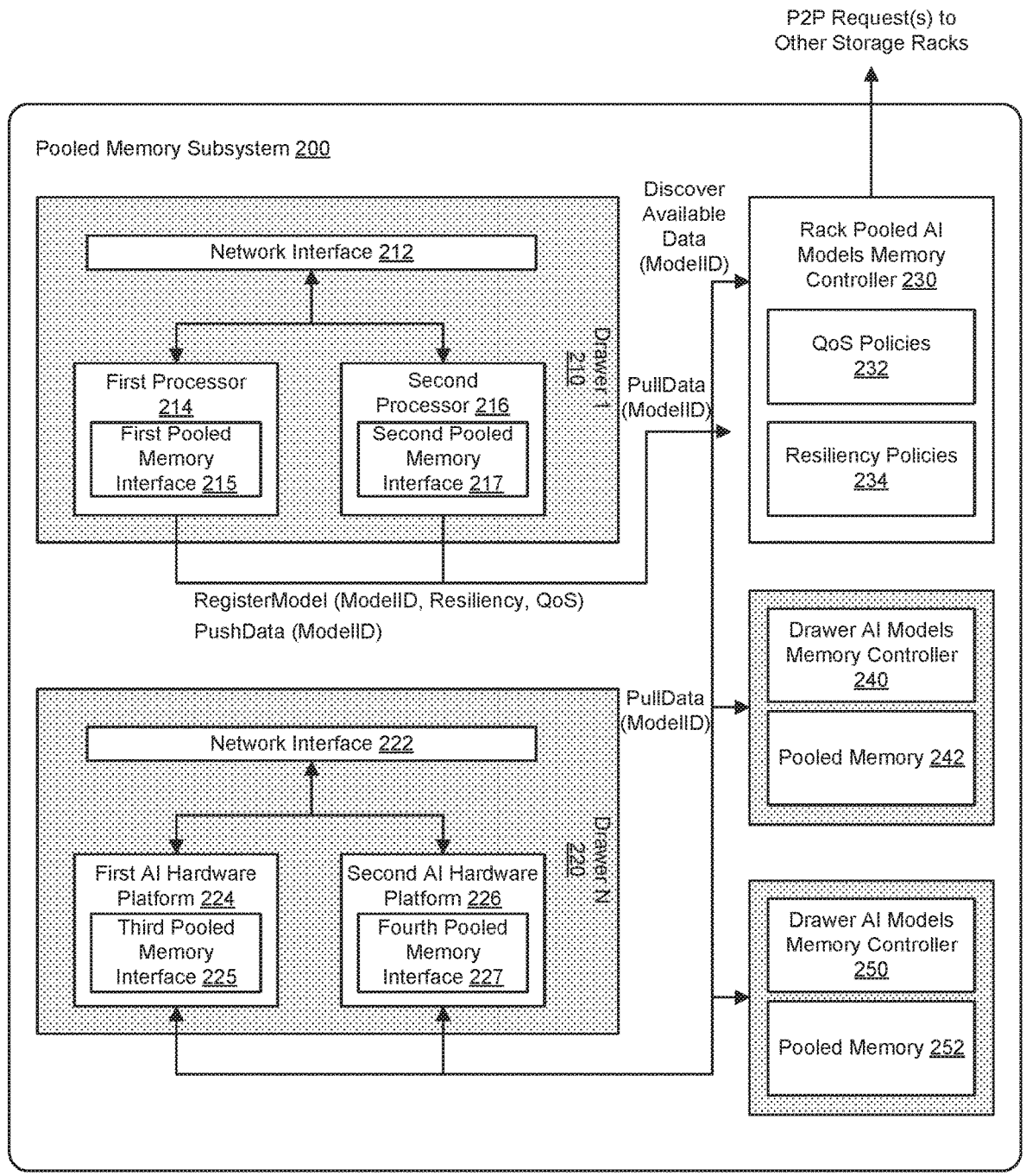
FIG. 2 illustrates a pooled memory subsystem that includes a memory controller in accordance with an example embodiment.

FIG. 2 illustrates an example of a pooled memory subsystem 200 that includes a rack pooled AI models memory controller 230 (or a memory controller). In one example, the pooled memory subsystem 200 can be included in a storage rack. The storage rack can be included in a data center, and the storage rack can be one of a plurality of storage racks in the data center. The pooled memory subsystem 200 can include multiple drawers, such as a first drawer 210 (drawer 1) and an Nth drawer 220 (drawer N). Each drawer can include processor(s), AI hardware platform(s), network interface(s), drawer memory controllers, pooled memory, etc.

In one example, the first drawer 210 can include a first processor 214 and a second processor 216, which can be connected to a network interface 212. The first processor 214 and the second processor 216 can communicate with the rack pooled AI models memory controller 230. In addition, the first processor 214 can include a first pooled memory interface 215 and the second processor 216 can include a second pooled memory interface 217. The first pooled memory interface 215 and the second pooled memory interface 217 can communicate with a drawer AI models memory controller 240 and a drawer AI models memory controller 250 (or secondary memory controllers in the pooled memory subsystem), which can have access to a pooled memory 242 and a pooled memory 252, respectively.

In one example, the Nth drawer 220 can include a first AI hardware platform 224 and a second AI hardware platform 226, which can be connected to a network interface 222. The first AI hardware platform 224 and the second AI hardware platform 226 can communicate with the racked pooled AI models memory controller 230. In addition, the first AI hardware platform 224 can include a third pooled memory interface 225 and the second AI hardware platform 226 can include a fourth pooled memory interface 227. The first AI hardware platform 224 and the second AI hardware platform 226 can communicate with the drawer AI models memory controller 240 and the drawer AI models memory controller 250, which can have access to the pooled memory 242 and the pooled memory 252, respectively.

In one example, access to the pooled memory 242 and the pooled memory 252, respectively, can be achieved via the network interface 212 in the first drawer 210 and the network interface 222 in the Nth drawer 220.

In one configuration, the rack pooled AI models memory controller 230 can receive a request from the first processor 214 (or alternatively from a host or node or core) to store training data in the pooled memory subsystem 200. For example, the request can be to store the training data in pooled memory (e.g., the pooled memory 242 or the pooled memory 252) in the pooled memory subsystem 200. The request can include the training data to be stored and an AI model ID that identifies an AI model that is associated with the training data. In other words, the training data to be stored in the pooled memory subsystem 200 can be used to train a corresponding AI model (with the AI model ID) in the pooled memory subsystem 200. The AI model can be a training or inferencing AI model. In one example, after receiving the request, the rack pooled AI models memory controller 230 can initiate a store operation (e.g., send a write request) to store the training data associated with the model ID in the pooled memory subsystem 200. More specifically, the rack pooled AI models memory controller 230 can store the training data in a memory region in the pooled memory(s) 242, 252 that is allocated for the model ID.

In one example, the rack pooled AI models memory controller 230 can store the training data in the memory region in the pooled memory(s) 242, 252 via the drawer AI models memory controller(s) 240, 250. In other words, the rack pooled AI models memory controller 230 may not directly store the training data in the pooled memory(s) 242, 252, but rather the rack pooled AI models memory controller 230 can indirectly store the training data in the pooled memory(s) 242, 252 via the drawer AI models memory controller(s) 240, 250. In addition, the pooled memory(s) 242, 252 can expose interfaces to increase or decrease an amount of memory devoted to particular AI model IDs. The pooled memory(s) 242, 252 can dynamically and autonomously increase or decrease the amount of memory devoted to particular AI model ID, which can be an improvement to previous solutions. Otherwise, the software stack would undesirably use the interfaces to increase or reduce the amount of pooled memory.

As a non-limiting example, the first processor 214 can be a data provider that receives vehicle sensor data, for example, from an Internet of Things (IoT) device. The first processor 214 can provide the vehicle sensor data for storage in the pooled memory(s) 242, 252 in the pooled memory subsystem 200. The vehicle sensor data can be associated with a vehicle AI model (which corresponds to a vehicle AI model ID) that runs in the pooled memory subsystem 200. The first processor 214 can send a storage request (or a push data command) that includes the vehicle sensor data and an indication of the vehicle AI model. In response to receiving the storage request, the rack pooled AI models memory controller 230 can store the vehicle sensor data in a memory region in the pooled memory(s) 242, 252 that is allocated for the vehicle AI model ID. In other words, the memory region may have been previously allocated for vehicle sensor data that is associated with the vehicle AI model ID. When the rack pooled AI models memory controller 230 receives the request to store the vehicle sensor data, the rack pooled AI models memory controller 230 can store the vehicle sensor data in the previously allocated memory region in the pooled memory(s) 242, 252.

In one configuration, the rack pooled AI models memory controller 230 can receive a request from the first AI hardware platform 224 that runs the AI model, and the request can be to read the training data from the memory region in the pooled memory(s) 242, 252 that is allocated for the AI model ID (that corresponds to the AI model). In one example, after receiving the request, the rack pooled AI models memory controller 230 can initiate a read operation (e.g., send a read request) to read the training data from the memory region in the pooled memory(s) 242, 252. In addition, the rack pooled AI models memory controller 230 can read the training data from the memory region based on the AI model ID. The rack pooled AI models memory controller 230 can provide retrieved training data to the first AI hardware platform 224 that runs the AI model, and the training data can be used to train the AI model at the first AI hardware platform 224.

In one example, the rack pooled AI models memory controller 230 can read the training data from the memory region in the pooled memory(s) 242, 252 via the drawer AI models memory controller(s) 240, 250. In other words, the rack pooled AI models memory controller 230 may not directly read the training data from the pooled memory(s) 242, 252, but rather the rack pooled AI models memory controller 230 can indirectly read the training data from the pooled memory(s) 242, 252 via the drawer AI models memory controller(s) 240, 250.

As a non-limiting example, the first AI hardware platform 224 can be a data consumer that consumes vehicle sensor data when training a vehicle AI model that runs at the first AI hardware platform 224. The first AI hardware platform 224 can consume vehicle sensor data that is stored in the pooled memory subsystem 200. For example, the first AI hardware platform 224 can send a read request (or a pull data command) that includes an indication of the vehicle AI model. In response to receiving the read request, the rack pooled AI models memory controller 230 can read the vehicle sensor data from a memory region in the pooled memory(s) 242, 252 that is allocated for the vehicle AI model ID. In other words, based on the vehicle AI model ID that was included in the read request, the rack pooled AI models memory controller 230 can identify the memory region in the pooled memory(s) 242, 252 that is allocated for the vehicle AI model ID, and then read the vehicle sensor data from the memory region. The rack pooled AI models memory controller 230 can provide the retrieved vehicle sensor data to the first AI hardware platform 224, and the first AI hardware platform 224 can consume the vehicle sensor data for training the vehicle AI model that is running at the first AI hardware platform 224.

In one example, the rack pooled AI models memory controller 230 can receive a request from the second processor 216 to read the training data from the memory region in the pooled memory(s) 242, 252 that is allocated for the AI model ID (that corresponds to the AI model). In one example, after receiving the request, the rack pooled AI models memory controller 230 can initiate a read operation to read the training data from the memory region in the pooled memory(s) 242, 252. The rack pooled AI models memory controller 230 can read the training data from the memory region based on the AI model ID. The rack pooled AI models memory controller 230 can provide retrieved training data to the second processor 216. The second processor 216 can store the training data in a local memory or cache that is configured to store training data per AI model ID, and the training data can be accessible to an application that runs on the second processor 216.

In one example, the rack pooled AI models memory controller 230 can store the training data in the memory region in the pooled memory(s) 242, 252 and read the training data from the memory region in the pooled memory(s) 242, 252, respectively, on a per model ID basis. In this example, the rack pooled AI models memory controller 230 can write and read training data sets for a particular AI model ID (that corresponds to an AI model). In other words, the training data that is written to the memory region or read from the memory region in the pooled memory(s) 242, 252 can be addressable based on the model ID.

Additionally or alternatively, the training data that is written to the memory region or read from the memory region in the pooled memory(s) 242, 252 can be addressable based on an AI model type of the AI model that is associated with the training data. For example, the rack pooled AI models memory controller 230 can receive a read command to read training data that is associated with a vehicle AI model type (and there can potentially be multiple AI model IDs that correspond to the vehicle AI model type). Therefore, the rack pooled AI models memory controller 230 can access training data based on the AI model type of the AI model associated with the training data.

In previous solutions, memory would be addressed using memory lines. For example, one memory line can be 64 bytes of data. Thus, in previous solutions, when a processor performed an operation in memory (e.g., a read or write operation), the processor would know a physical memory address for particular data to be accessed. The processor would fetch that data from the physical memory address, and that data would be placed in a processor register and accessible to an application. In the present solution, rather than the pooled memory(s) 242, 252 being addressable with physical memory addresses, the pooled memory(s) 242, 252 can be addressable with AI model IDs.

In one configuration, the rack pooled AI models memory controller 230 can receive a request to register an AI model ID (associated with an AI model) from the first processor 214. At this point, when the request is received, there is no allocation for training data associated with the AI model ID in the pooled memory 242, 252 in the pooled memory subsystem 200. The request received from the first processor 214 can include the AI model ID associated with the AI model, a desired quality of service (QoS) for the AI model as defined in a service level agreement (SLA), a resiliency level for the AI model and a memory capacity to store training data for the AI model (e.g., an amount of memory that is to be allocated for the storage of training data for the AI model). In one example, the request can be a register model command that includes the AI model ID, the resiliency level and the desired QoS). In response to receiving the request, the rack pooled AI models memory controller 230 can register the AI model ID, which can involve allocating a memory region(s) in the pooled memory(s) 242, 252 for storage of training data associated with the AI model ID, where the allocation of the memory region(s) can correspond to the memory capacity included in the request received from the first processor 214.

In one example, the drawers in the pooled memory subsystem 200 (e.g., the first drawer 210 (drawer 1) and the Nth drawer 220 (drawer N) can include memory extensions, which can include the pooled memory(s) 242, 252. Different portions of the pooled memory(s) 242, 252 can be allocated for different AI models depending on individual requirements (in terms of memory) of the AI models. More specifically, a portion of memory in the pooled memory(s) 242, 252 can be allocated for a specific AI model ID. The portion of memory can be allocated based on a specified size of training data set(s) for that AI model ID. As a result, training data related to that AI model ID can be stored in the previously allocated portion of memory in the pooled memory(s) 242, 252 (i.e., in the portion of memory specifically allocated for that type of training data). After the portion of memory is allocated for the AI model ID, the training data for the AI model ID stored in the portion of memory can be accessed using the AI model ID (or data set ID), as opposed to physical memory addresses of memory in the pooled memory(s) 242, 252.

As an example, the rack pooled AI models memory controller 230 can receive a request to read training data associated with AI model ID 100 or data set ID 15 of the AI model ID 100, and in response, the rack pooled AI models memory controller 230 can retrieve the requested training data from the portion of memory that is allocated in the pooled memory(s) 242, 252 for AI model ID 100. The rack pooled AI models memory controller 230 can return the training data associated with AI model ID 100 or data set ID 15 of the AI model ID 100.

In one example, the rack pooled AI models memory controller 230 can store QoS policies 232 and resiliency policies 234 for a plurality of AI models IDs. A QoS policy 232 and a resiliency policy 234 can be defined when a particular AI model ID is registered at the rack pooled AI models memory controller 230. The QoS policy 232 can indicate a desired QoS for a particular AI model ID. For example, training data for a particular AI model ID can be written to the pooled memory 242, 252 or read from the pooled memory 242, 252 in accordance with a defined bandwidth that satisfies the QoS policy 232 for that particular AI model ID. In other words, a training data stream for that particular AI model ID can be provided with a certain amount of bandwidth that complies with the QoS policy 232 for that particular AI model ID. In addition, the QoS policy 232 can be SLA based for bandwidth or priority based per data flow. The resiliency policy 234 can indicate a desired resiliency level for a particular AI model ID. For example, a particular model ID can have a desired resiliency level of 90%. Different pooled memory(s) 242, 252 can have different resiliency properties or characteristics. Therefore, as an example, the rack pooled AI models memory controller 230 can allocate a first memory region in the pooled memory 242 and a second memory region in the pooled memory 252 (which may be in different drawers), which can enable training data to be stored and read in accordance with the desired resiliency level.

In one configuration, the rack pooled AI models memory controller 230 can send discovery information to the first processor 214 and/or the first AI hardware platform 224 in the pooled memory subsystem 200. For example, the rack pooled AI models memory controller 230 can receive a discover available data request for a particular AI model ID from the first processor 214 and/or the first AI hardware platform 224, and in response, the rack pooled AI models memory controller 230 can send discovery information for that particular AI model ID. In other words, the discovery information can enable the first processor 214 and/or the first AI hardware platform 224 to discover available training data per AI model ID in the pooled memory(s) 242, 252 in the pooled memory subsystem 200.

As a non-limiting example, the first AI hardware platform 224 can host a fraud detection AI model. The first AI hardware platform 224 may wish to obtain fraud detection training data is stored in the pooled memory(s) 242, 252, which can be consumed by the first AI hardware platform 224 to train the fraud detection AI model. The first AI hardware platform 224 can know a fraud detection AI model ID that is associated with the fraud detection training data, but may not initially know whether fraud detection training data associated with the fraud detection AI model ID is being stored in the pooled memory(s) 242, 252. The first AI hardware platform 224 can send a discover available data request for the fraud detection AI model ID to the rack pooled AI models memory controller 230. In response, the rack pooled AI models memory controller 230 can provide discovery information, which can indicate that the fraud detection training data corresponding to the fraud detection AI model ID is currently stored in the pooled memory(s) 242, 252. Based on this discovery information, the first AI hardware platform 224 can send a read request for the fraud detection AI model ID to read the fraud detection training data from the pooled memory(s) 242, 252.

In one configuration, the rack pooled AI models memory controller 230 can receive a request from the first processor 214 to store training data in the pooled memory(s) 242, 252. The request can include the training data to be stored and an AI model ID that identifies an AI model that is associated with the training data. The rack pooled AI models memory controller 230 can initiate a store operation to store the training data associated with the AI model ID across multiple memory regions in the pooled memory(s) 242, 252 of the pooled memory subsystem 200. The rack pooled AI models memory controller 230 can distribute the training data across multiple memory regions to satisfy an SLA for the AI model ID. For example, distributing the training data across the multiple memory regions can achieve a desired store time in accordance with the SLA for the AI model ID, and this desired store time may not be achieved by writing the training data to a single memory region in a single pooled memory. In addition, the rack pooled AI models memory controller 230 can initiate a read operation to read the training data from one or more of the multiple memory regions, and the training data can be read from selected memory regions to satisfy the SLA for the AI model ID.

In one configuration, the rack pooled AI models memory controller 230 can receive a request from the first processor 214 to store training data in the pooled memory subsystem 200. For example, the first processor 214 can request that a store operation be performed in accordance with a desired QoS (e.g., a desired bandwidth), resiliency level, etc. The rack pooled AI models memory controller 230 can receive the request and determine that that the rack pooled AI models memory controller 230 is unable to process the request with the desired QoS, resiliency level, etc. In other words, the rack pooled AI models memory controller 230 may be unable to fulfill the storage request (or write request) for the first processor 214. In this case, the rack pooled AI models memory controller 230 can send a negative acknowledgement (NACK) to the first processor 214, and the rack pooled AI models memory controller 230 can forward the request as a peer-to-peer (P2P) request to a second rack pooled AI models memory controller (or second memory controller) in the data center. The second rack pooled AI models memory controller can be outside of the pooled memory subsystem 200, but within the data center. The rack pooled AI models memory controller 230 can maintain information about a plurality of rack pooled AI models memory controllers in the data center and their respective capabilities. Based on this information, the rack pooled AI models memory controller 230 can forward the request to the second rack pooled AI models memory controller, and the second rack pooled AI models memory controller can initiate the store operation requested by the first processor 214.

Figure 3:
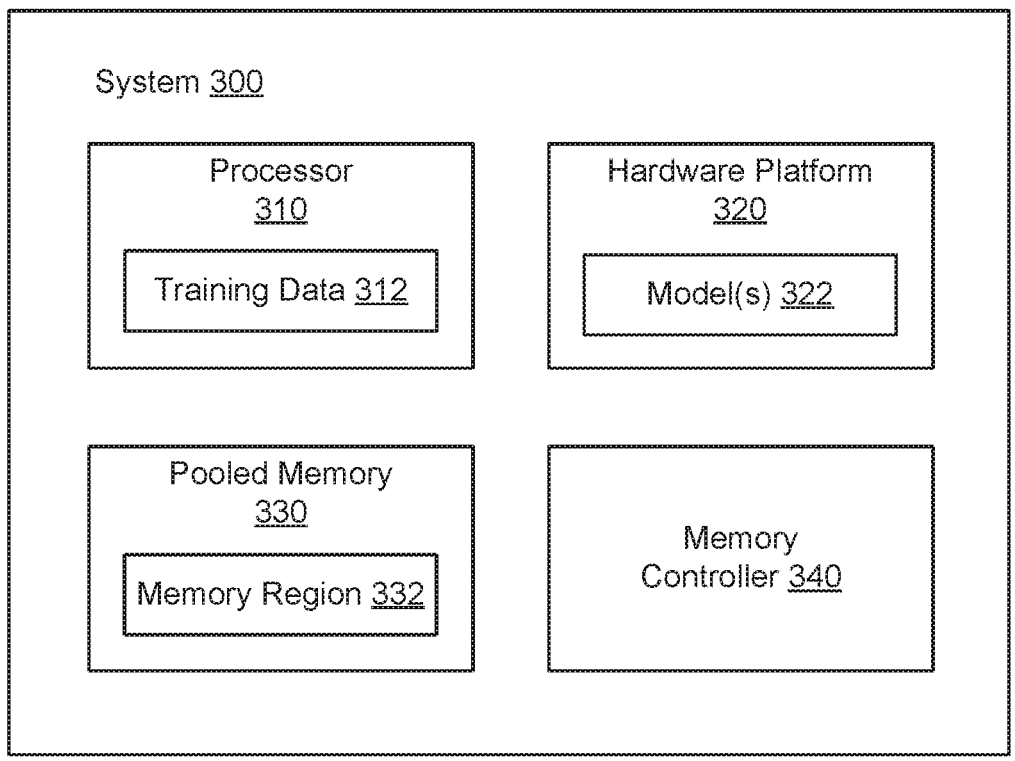
FIG. 3 illustrates a system for storing training data in memory in accordance with an example embodiment.

FIG. 3 illustrates a system 300 for storing training data 312 in pooled memory 330. The system 300 can include a processor 310 operable to provide training data 312. The system 300 can include a hardware platform 320 that runs a model 322. The system 300 can include the pooled memory 330 that includes a memory region 332. The system 300 can include a memory controller 340. The memory controller 340 can receive a request from the processor 310 to store the training data 312. The request can include the training data 312 to be stored and a model identifier (ID) that identifies the model 322 that is associated with the training data 312. The memory controller 340 can initiate a store operation to store the training data 312 associated with the model ID in the memory region 332 in the pooled memory 330 that is allocated for the model ID. The training data 312 that is stored in the memory region 332 in the pooled memory 330 is addressable based on the model ID.

Figure 4:
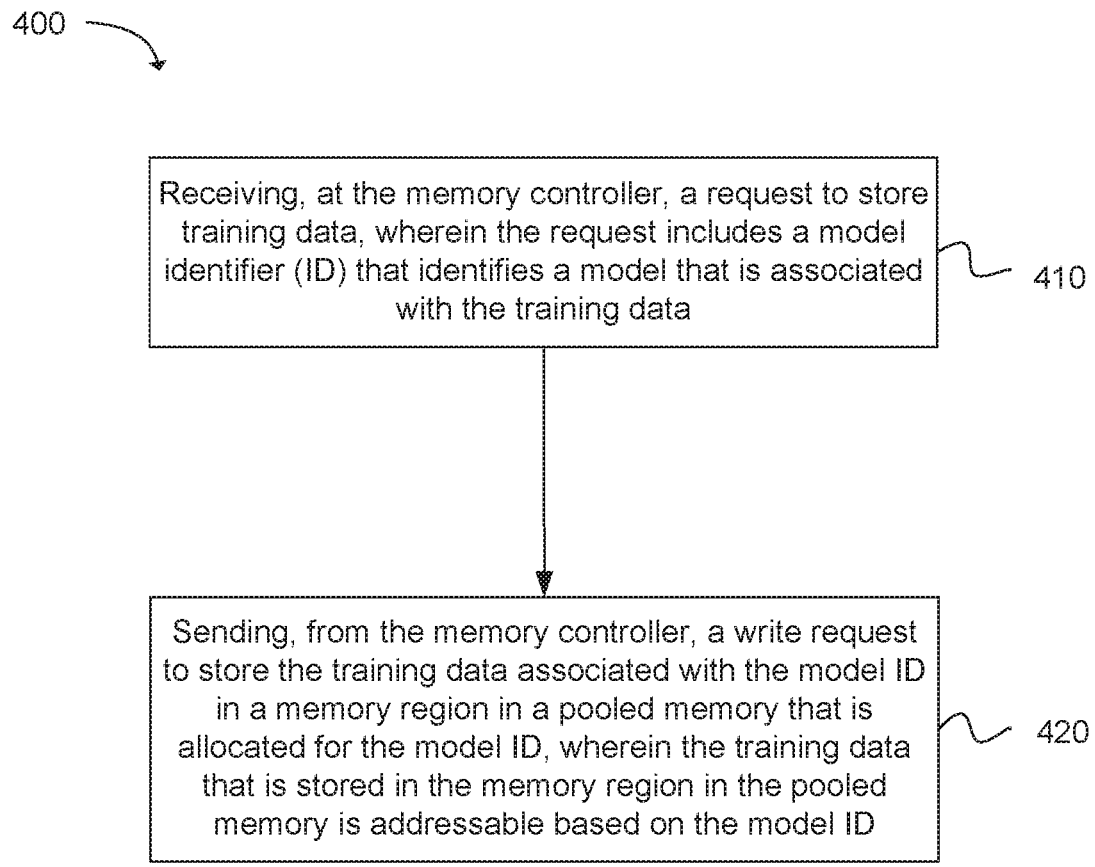
FIG. 4 is a flowchart illustrating operations for performing an operation at a memory controller in accordance with an example embodiment.

Another example provides a method 400 for initiating operations at a memory controller, as shown in the flow chart in FIG. 4. The method can be executed as instructions on a machine, where the instructions are included on at least one computer readable medium or one non-transitory machine readable storage medium. The method can include the operation of: receiving, at the memory controller, a request to store training data, wherein the request includes a model identifier (ID) that identifies a model that is associated with the training data, as in block 410. The method can include the operation of: sending, from the memory controller, a write request to store the training data associated with the model ID in a memory region in a pooled memory that is allocated for the model ID, wherein the training data that is stored in the memory region in the pooled memory is addressable based on the model ID, as in block 420.

Figure 5:
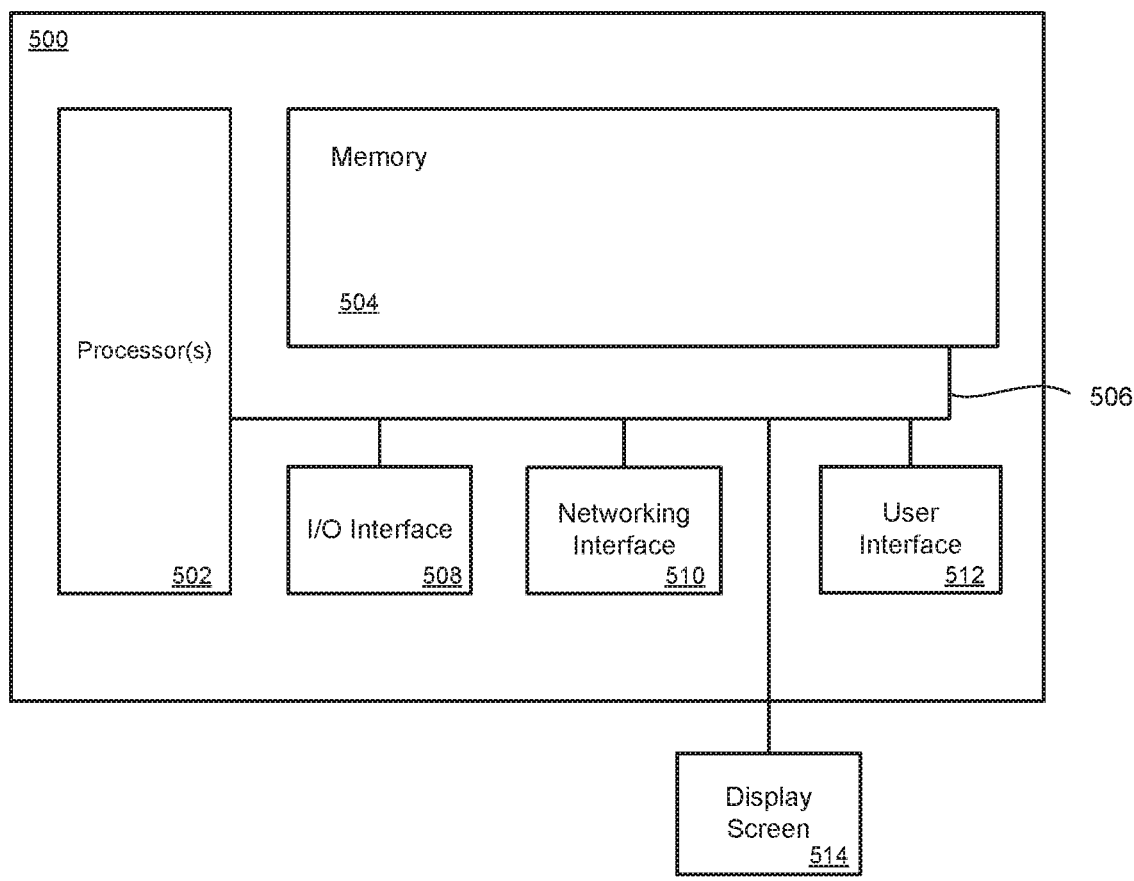
FIG. 5 illustrates a computing system that includes a data storage device in accordance with an example embodiment.

FIG. 5 illustrates a general computing system or device 500 that can be employed in the present technology. The computing system or 500 can include a processor 502 in communication with a memory 504. The memory 504 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing system or device 500 additionally includes a local communication interface 506 for connectivity between the various components of the system. For example, the local communication interface 506 can be a local data bus and/or any related address or control busses as may be desired.

The computing system or device 500 can also include an I/O (input/output) interface 508 for controlling the I/O functions of the system, as well as for I/O connectivity to devices outside of the computing system or device 500. A network interface 510 can also be included for network connectivity. The network interface 510 can control network communications both within the system and outside of the system. The network interface can include a wired interface, a wireless interface, a Bluetooth interface, optical interface, and the like, including appropriate combinations thereof. Furthermore, the computing system 500 can additionally include a user interface 512, a display device 514, as well as various other components that would be beneficial for such a system.

The processor 502 can be a single or multiple processors, and the memory 504 can be a single or multiple memories. The local communication interface 506 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example, there is provided a memory controller comprising logic. The logic can receive, at the memory controller, a request to store training data, wherein the request includes a model identifier (ID) that identifies a model that is associated with the training data. The logic can send, from the memory controller, a write request to store the training data associated with the model ID in a memory region in a pooled memory that is allocated for the model ID, wherein the training data that is stored in the memory region in the pooled memory is addressable based on the model ID.

In one example of the memory controller, the training data that is stored in the memory region in the pooled memory is further addressable based on a model type of the model that is associated with the training data.

In one example of the memory controller, the logic is further configured to: receive, from a hardware platform that runs the model, a request to read the training data from the memory region in the pooled memory that is allocated for the model ID; send a read request to read the training data from the memory region in the pooled memory, wherein the training data is read from the memory region based on the model ID or a model type of the model that is associated with the training data; and provide the training data to the hardware platform to enable the hardware platform to train the model using the training data.

In one example of the memory controller, the logic is further configured to register the model in response to a request received from a processor, wherein the request includes the model ID associated with the model, a desired quality of service (QoS) for the model as defined in a service level agreement (SLA), a resiliency level for the model and a memory capacity to store training data for the model, wherein a registration of the model includes an allocation of the memory region in the pooled memory for storage of training data for the model ID, and the allocation of the memory region corresponds to the memory capacity included in the request.

In one example of the memory controller, the logic is further configured to provide discovery information to one or more of a processor or a hardware platform to enable discovery of available training data per model ID in the pooled memory.

In one example of the memory controller, the logic is further configured to forward the request received from a processor as a peer-to-peer (P2P) request to a second memory controller in a data center, wherein the P2P request is sent to the second memory controller when the request received from the processor is unable to be processed at the memory controller, wherein the memory controller includes information that identifies a presence of the second memory controller.

In one example of the memory controller, the logic is further configured to: send a write request to store the training data associated with the model ID across multiple memory regions in the pooled memory that are allocated for the model ID, wherein the training data is distributed across the multiple memory regions to satisfy a service level agreement (SLA) for the model ID; and send a read request to read the training data from one or more of the multiple memory regions, wherein the training data is read from selected memory regions to satisfy the SLA for the model ID.

In one example of the memory controller, the logic is further configured to store the training data in the pooled memory and read the training data from the pooled memory, respectively, via a secondary memory controller that interfaces with one of a processor or a hardware platform that runs the model.

In one example of the memory controller, the logic is further configured to store the training data in the pooled memory and read the training data from the pooled memory, respectively, on a per model ID basis.

In one example of the memory controller, the pooled memory is configured to dynamically increase or decrease an amount of data associated to a particular model ID.

In one example of the memory controller, the model is an artificial intelligence (AI) model.

In one example of the memory controller, the model that is trained using the training data is an inferencing artificial intelligence (AI) model.

In one example of the memory controller, the memory controller is included in a storage rack in a data center.

In one example, there is provided a system for storing training data in pooled memory. The system can comprise a processor operable to provide training data. The system can comprise a hardware platform that runs a model. The system can comprise a pooled memory that includes a memory region. The system can comprise a memory controller comprising logic. The logic can receive a request from the processor to store the training data, wherein the request includes a model identifier (ID) that identifies the model that is associated with the training data. The logic can send a write request to store the training data associated with the model ID in the memory region in the pooled memory that is allocated for the model ID, wherein the training data that is stored in the memory region in the pooled memory is addressable based on the model ID.

In one example of the system, the training data that is stored in the memory region in the pooled memory is further addressable based on a model type of the model that is associated with the training data.

In one example of the system, the model is an artificial intelligence (AI) model.

In one example of the system, the memory controller further comprises logic to register the model in response to a request received from the processor, wherein the request includes the model ID associated with the model, a desired quality of service (QoS) for the model as defined in a service level agreement (SLA), a resiliency level for the model and a memory capacity to store training data for the model, wherein a registration of the model includes an allocation of the memory region in the pooled memory for storage of training data for the model ID, and the allocation of the memory region corresponds to the memory capacity included in the request.

In one example of the system, the memory controller further comprises logic to provide discovery information to one or more of the processor or a hardware platform to enable discovery of available training data per model ID in the pooled memory.

In one example of the system, the memory controller further comprises logic to forward the request received from the processor as a peer-to-peer (P2P) request to a second memory controller, wherein the P2P request is sent to the second memory controller when the request received from the processor is unable to be processed at the memory controller, wherein the memory controller includes information that identifies a presence of the second memory controller.

In one example of the system, the memory controller further comprises logic to: send a write request to store the training data associated with the model ID across multiple memory regions in the pooled memory that are allocated for the model ID, wherein the training data is distributed across the multiple memory regions to satisfy a service level agreement (SLA) for the model ID; and send a read request to read the training data from one or more of the multiple memory regions, wherein the training data is read from selected memory regions to satisfy the SLA for the model ID.

In one example, there is provided a method for initiating operations at a memory controller. The method can comprise the operation of: receiving, at the memory controller, a request to store training data, wherein the request includes a model identifier (ID) that identifies a model that is associated with the training data. The method can comprise the operation of: sending, from the memory controller, a write request to store the training data associated with the model ID in a memory region in a pooled memory that is allocated for the model ID, wherein the training data that is stored in the memory region in the pooled memory is addressable based on the model ID.

In one example of the method for initiating operations at the memory controller, the method further comprises: receiving, from a hardware platform that runs the model, a request to read the training data from the memory region in the pooled memory that is allocated for the model ID; sending a read request to read the training data from the memory region in the pooled memory, wherein the training data is read from the memory region based on the model ID or a model type of the model that is associated with the training data; and providing the training data to the hardware platform to enable the hardware platform to train the model using the training data.

In one example of the method for initiating operations at the memory controller, the method further comprises: registering the model in response to a request received from a processor, wherein the request includes the model ID associated with the model, a desired quality of service (QoS) for the model as defined in a service level agreement (SLA), a resiliency level for the model and a memory capacity to store training data for the model, wherein a registration of the model includes an allocation of the memory region in the pooled memory for storage of training data for the model ID, and the allocation of the memory region corresponds to the memory capacity included in the request.

In one example of the method for initiating operations at the memory controller, the method further comprises: providing discovery information to one or more of a processor or a hardware platform to enable discovery of available training data per model ID in the pooled memory.

In one example of the method for initiating operations at the memory controller, the method further comprises: forwarding the request received from a processor as a peer-to-peer (P2P) request to a second memory controller in a data center, wherein the P2P request is sent to the second memory controller when the request received from the processor is unable to be processed at the memory controller, wherein the memory controller includes information that identifies a presence of the second memory controller.

In one example of the method for initiating operations at the memory controller, the method further comprises: sending a write request to store the training data associated with the model ID across multiple memory regions in the pooled memory that are allocated for the model ID, wherein the training data is distributed across the multiple memory regions to satisfy a service level agreement (SLA) for the model ID; and sending a read request to read the training data from one or more of the multiple memory regions, wherein the training data is read from selected memory regions to satisfy the SLA for the model ID.

In one example of the method for initiating operations at the memory controller, the method further comprises: storing the training data in the pooled memory and reading the training data from the pooled memory, respectively, via a secondary memory controller that interfaces with one of a processor or a hardware platform that runs the model.

In one example of the method for initiating operations at the memory controller, the method further comprises: storing the training data in the pooled memory and reading the training data from the pooled memory, respectively, on a per model ID basis.

In one example of the method for initiating operations at the memory controller, the model is an artificial intelligence (AI) model.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A memory controller, comprising logic to:
   receive a request to register a model associated with training data, the request to register the model indicates a model identifier (ID) for the model, a desired quality of service (QoS) for the model as defined in a service level agreement (SLA) and a memory capacity to store training data for the model;
   register the model via allocation of at least one memory region in a pooled memory to the model ID, the allocation of the at least one memory region to the model ID to correspond to the memory capacity included in the request;
   receive a request to store training data that includes the model ID; and
   send a write request to cause the training data to be stored in the at least one memory region, wherein the training data that is stored in the at least one memory region is addressable based on the model ID.

2. The memory controller of claim 1, wherein the training data that is stored in the at least one memory region is further addressable based on a model type of the model that is associated with the training data.

3. The memory controller of claim 1, wherein the logic is further configured to:
   receive, from a hardware platform that runs the model, a request to read the training data from the at least one memory region;
   send a read request to read the training data from the at least one memory region, wherein the training data is read from the at least one memory region based on the model ID or a model type of the model; and
   provide the training data to the hardware platform to enable the hardware platform to train the model using the training data.

4. The memory controller of claim 1, wherein the logic is further configured to provide discovery information to one or more of a processor or a hardware platform to enable discovery of available training data per model ID in the pooled memory.

5. The memory controller of claim 1, wherein the logic is further configured to forward the request received from a processor as a peer-to-peer (P2P) request to a second memory controller in a data center, wherein the P2P request is sent to the second memory controller when the request received from the processor is unable to be processed at the memory controller, wherein the memory controller includes information that identifies a presence of the second memory controller.

6. The memory controller of claim 1, wherein the at least one memory region includes multiple memory regions, the logic is further configured to:
   send a write request to store cause the training data associated with the model ID to be stored across the multiple memory regions, wherein the training data is distributed across the multiple memory regions to satisfy the SLA; and
   send a read request to read the training data from a selection of one or more of the multiple memory regions, the training data is read from the selected one or more memory regions to satisfy the SLA.

7. The memory controller of claim 1, wherein the logic is further configured to cause the training data to be stored in the at least one memory region and read the training data from the at least one memory region, respectively, via a secondary memory controller that interfaces with one of a processor or a hardware platform that runs the model.

8. The memory controller of claim 1, wherein the logic is further configured to cause the training data to be stored in the at least one memory region and read the training data from the at least one memory region, respectively, on a per model ID basis.

9. The memory controller of claim 1, wherein the pooled memory is configured to dynamically increase or decrease an amount of data associated to a particular model ID.

10. The memory controller of claim 1, wherein the model is an artificial intelligence (AI) model.

11. The memory controller of claim 1, wherein the model that is trained using the training data is an inferencing artificial intelligence (AI) model.

12. The memory controller of claim 1, wherein the memory controller is included in a storage rack in a data center.

13. A system for storing training data in pooled memory, the system comprising:
a processor operable to provide training data;
a hardware platform that runs a model;
a pooled memory that includes a memory region; and
a memory controller to include logic, the logic to:
receive a request from the processor to register a model associated with training data, the request to register the model indicates a model identifier (ID) for the model, a desired quality of service (QoS) for the model as defined in a service level agreement (SLA) and a memory capacity to store training data for the model;
register the model via allocation of at least one memory region in a pooled memory to the model ID, the allocation of the at least one memory region to the model ID to correspond to the memory capacity included in the request;
receive a request from the processor to store the training data, the request to include the model ID; and
send a write request to cause the training data to be stored in the at least one memory region, wherein the training data that is stored in the at least one memory region is addressable based on the model ID.

14. The system of claim 13, wherein the training data that is stored in the at least one memory region is further addressable based on a model type of the model that is associated with the training data.

15. The system of claim 13, wherein the model is an artificial intelligence (AI) model.

16. The system of claim 13, wherein the memory controller further comprises logic to provide discovery information to one or more of the processor or a hardware platform to enable discovery of available training data per model ID in the pooled memory.

17. The system of claim 13, wherein the memory controller further comprises logic to forward the request received from the processor as a peer-to-peer (P2P) request to a second memory controller, wherein the P2P request is sent to the second memory controller when the request received from the processor is unable to be processed at the memory controller, wherein the memory controller includes information that identifies a presence of the second memory controller.

18. The system of claim 13, wherein the at least one memory region includes multiple memory regions, the memory controller further comprises logic to:
send a write request to cause the training data associated with the model ID to be stored across the multiple memory regions, wherein the training data is distributed across the multiple memory regions to satisfy the SLA; and
send a read request to read the training data from a selection of one or more of the multiple memory regions, the training data is read from the selected one or more memory regions to satisfy the SLA.

19. A method for initiating operations at a memory controller, the method comprising:
receiving a request to register a model associated with training data, the request to register the model indicates a model identifier (ID) for the model, a desired quality of service (QoS) for the model as defined in a service level agreement (SLA) and a memory capacity to store training data for the model;
registering the model via allocation of at least one memory region in a pooled memory to the model ID, the allocation of the at least one memory region to the model ID to correspond to the memory capacity included in the request;
receiving a request to store training data that includes the model ID; and
sending a write request to cause the training data to be stored in the at least one memory region, wherein the training data that is stored in the at least one memory region is addressable based on the model ID.

20. The method of claim 19, further comprising:
receiving, from a hardware platform that runs the model, a request to read the training data from the at least one memory region;
sending a read request to read the training data from the at least one memory region, wherein the training data is read from the at least one memory region based on the model ID or a model type of the model; and
providing the training data to the hardware platform to enable the hardware platform to train the model using the training data.

21. The method of claim 19, further comprising:
the at least one memory region including multiple memory regions;
sending a write request to cause the training data associated with the model ID to be stored across the multiple memory regions, wherein the training data is distributed across the multiple memory regions to satisfy the SLA; and
sending a read request to read the training data from a selection of one or more of the multiple memory regions, the training data is read from the selected one or more memory regions to satisfy the SLA.

22. The method of claim 19, further comprising storing the training data in the at least one memory region pooled memory and read the training data from the at least one memory region, respectively, on a per model ID basis.

* * * * *